(No Model.) 2 Sheets—Sheet 2.

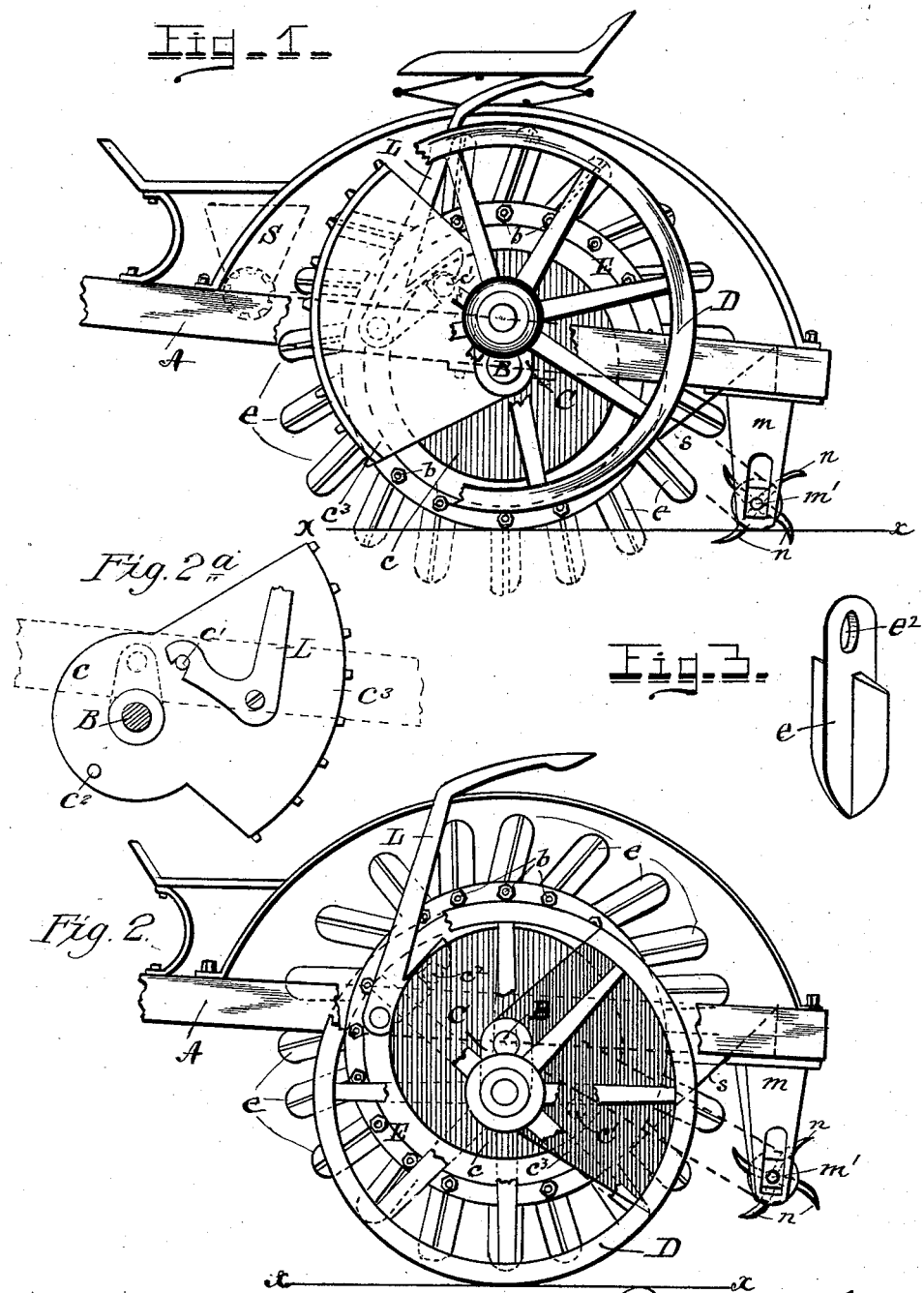

J. DARLING.
CULTIVATING IMPLEMENT.

No. 571,130. Patented Nov. 10, 1896.

Witnesses:
Frank H. Burman
D. H. Thrasher

Jeremiah Darling
Inventor,
By L. M. Hosea atty.

UNITED STATES PATENT OFFICE.

JEREMIAH DARLING, OF ERLANGER, KENTUCKY.

CULTIVATING IMPLEMENT.

SPECIFICATION forming part of Letters Patent No. 571,130, dated November 10, 1896.

Application filed October 9, 1895. Serial No. 565,188. (No model.)

*To all whom it may concern:*

Be it known that I, JEREMIAH DARLING, a citizen of the United States, residing at Erlanger, Kenton county, Kentucky, have invented new and useful Improvements in Cultivating Implements, of which the following is a specification.

My invention relates to agricultural appliances, its object being to construct an implement for loosening or "breaking up" the ground for the sowing of grain crops, &c., that may be operated by less expenditure of draft-power than a plow and perform the work of a given acreage more expeditiously. Its further object is to operate upon the ground not by upturning the earth, but by loosening and pulverizing it to a given depth after the manner of "spading," whereby a thin soil may not be impaired by upturning the clay or other unproductive elements beneath the surface.

To this end the invention consists in the wheeled implement hereinafter described, and illustrated in the accompanying drawings, embodying, essentially, a rotating drum (or a series of drums concentrically arranged upon a common axis) provided with a series of radial teeth having a pivoted connection with the drum or drums and a limited capacity for oscillation upon their pivots. In the rotation of the drum or drums the teeth are caused to penetrate the earth to the depth of their projection beyond the peripheral face of the drums and act as spades in loosening the earth toward the rear.

Other features of the invention relate to the construction of the implement as a wheeled vehicle adapted to raise the actuating parts and carry them clear of the ground or allow them to be lowered to actuating position.

In connection with the implement I may also employ a trailing harrow to pulverize the surface layer more thoroughly, and I may also employ suitable seeding devices whereby the preparation of the earth and the seeding of the crop may be done simultaneously.

My invention is illustrated in the accompanying drawings, in which—

Figure 4:
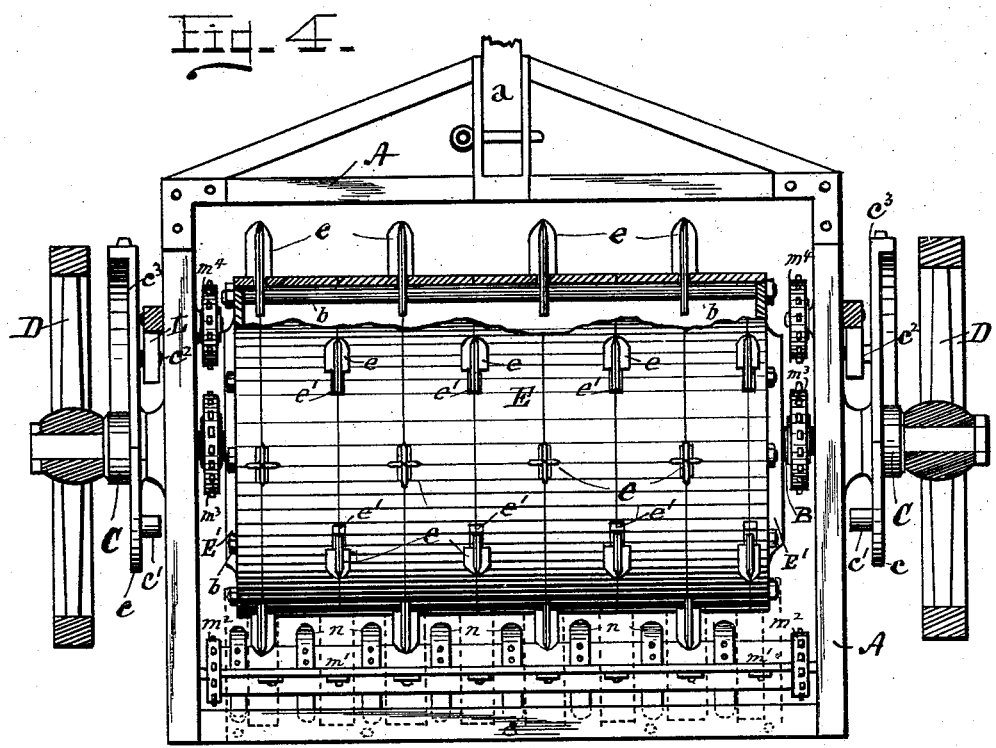
Figures 5, 6, 7:
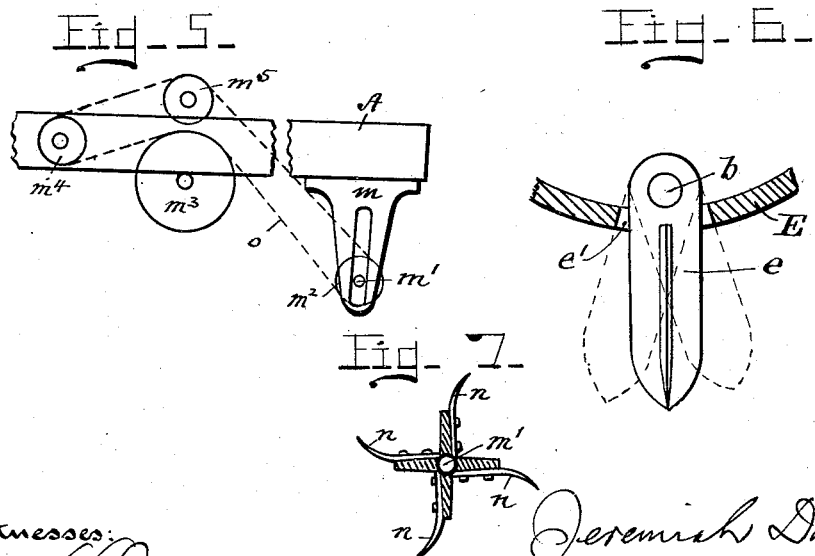

Figures 1 and 2 are side elevations of the implement complete, Fig. 1 showing the same adjusted to operative position and Fig. 2 to position for transportation upon its bearing-wheels. Fig. $2^a$ is an elevation of the disk and its segmental extension, looking from the frame outwardly. Fig. 3 is a perspective view of one of the spades detached. Fig. 4 is a plan view of the implement complete, partly sectioned to show construction and showing the scrapers in dotted lines. Fig. 5 is a diagram showing the arrangement of the driving connections of the trailer. Fig. 6 is a detail cross-section of part of the drum, showing the pivotal attachment and oscillating limits of the spades. Fig. 7 is a detail cross-section of the trailer-shaft, showing construction of the device.

Referring now to the drawings, A designates a rectangular frame mounted upon a central axial shaft B, to the termini of which outside of the frame are rotatively attached cranks C C, whose wrist-pins are the spindles of bearing-wheels D D, upon which the implement is transported to and from the field. A tongue A suggests the means by which a team of horses is employed for draft in its transportation.

The principal operating element of the device is a hollow drum E, carried loosely upon the shaft B within the frame, having pivoted spade-like implements e, which we may here call "spades," projecting radially therefrom. The frame being lowered in relation to its bearing-wheels, as hereinafter described, the entire vehicle, including the bearing-wheels, is carried upon the drum E as a roller, by whose rotation the spades e are forced into the earth by the weight of the vehicle to the depth of their radial projection and loosen the mass of earth rearward. As the implement passes onward the earth is left loosened in the path traversed.

The construction and action are more particularly as follows: The drum E is preferably made of adjacent sections having their peripheral edges recessed to form, when placed together, rectangular openings $e'$, through which the spades e project, as shown. The implements are secured together by end pieces E', held together by long bolts b, extended through from outside to outside, as indicated in Fig. 4. These bolts pass close behind the shell of the drum and in line, each to each, with sets of spades $e$, and form the pivotal pin or support by which the latter are engaged with the drum.

The spades $e$ are preferably formed, as shown in Fig. 3, of two longitudinal intersecting blades, one of which is prolonged beyond the other to form a shank, perforated, as at $e^2$, to engage the bolt $b$. The shorter blade projects its shoulders laterally over and outside of the opening in the shell of the drum, as indicated in Fig. 4, thus forming a support whereby the weight of the vehicle causes the spade to penetrate the earth, as indicated in Fig. 1, in which $xx$ indicates the ground-line. The spades $e$ have a fore-and-aft oscillation limited by the dimensions of the opening $e'$, as indicated in Fig. 6. In the rotation of the drum as they pass over the vertical diameter of the latter they drop forward and downward by gravity, as indicated in Figs. 1 and 2, so that upon reaching the earth they point nearly vertical and are forced easily into the earth. As the drum rolls onward each spade retains its angular relations with the earth until the opposite limit of the aperture $e'$ of the drum engages it and moves its lower point slightly backward, thereby loosening the mass of earth behind it. This rear motion increases as the spade is drawn upward, thereby assisting to completely detach the mass of earth. The earth is thus broken and loosened $in\ situ$, somewhat after the manner of spading, to a uniform depth.

The relative arrangement of the spades upon the roller is preferably as shown; that is to say, "staggered," in successive sets, each set occupying the intervals in relation to the next preceding.

I may use with the implement a suitable seeding apparatus, preferably located as indicated at S, Fig. 1, by which seed dropped in front of the roller are enabled to drop into the interstices of the earth in the loosening process described. As the form or character of the seeding apparatus is not material, further illustration is deemed unnecessary. I may also use in connection with the apparatus a trailer having somewhat the functions of the ordinary harrow, of which a preferred construction is as follows: In suitable brackets $m$, depending from the frame A at the rear of the roller E, is journaled a shaft $m'$, to which are bolted at intervals curved blades $n$, projecting radially.

The blades are similar to the ordinary shares employed in "cultivators."

Rotation is given to the shaft $m'$ by a chain-and-sprocket connection with the drum E. A preferred construction is indicated by diagram Fig. 5 and partially in Fig. 4. The shaft $m'$ is provided with end sprockets $m^2$, and the chain $o$ passes thence over an engaging sprocket $m^3$ upon the end of the drum E and around an idler sheave or sprocket $m^4$ forward of the same upon the frame, and thence back over a guide-sheave $m^5$ to the sprocket $m^3$. Similar chain-gear may be provided at each side.

The action of the chain is to give the shaft $m'$ a reverse motion, whereby the curved blades enter the earth only a few inches, breaking the clods and carrying part of the earth thus lifted backward over the shaft.

The device is useful in covering grain dropped in front and pulverizing and harrowing the surface.

For the purpose of lifting the roller E from the ground the following construction is provided: The cranks C are each provided or cast with a disk $c$ concentric with the shaft B, provided with two diametrically opposite inward projections $c'\ c^2$. The disk is extended at one side into a segmental projection $c^3$, whose periphery is struck from the wrist-pin $p$ as a center, thus making it eccentric to the disk $c$. The outer periphery of the segment is provided with radial projections or teeth, as shown, to assist in engaging with the earth. A hand-lever L, suitably formed to constitute an abutment acting against the stop $c'\ c^2$, is pivoted to the frame A at each side in control of the attendant, who occupies a seat on the top of the vehicle.

In Fig. 1 the lever L is in place against the stop $c'$, and the segment $c^3$ upon release of the lever will drop down into contact with the earth at its shorter radius, turning the crank forward. As the vehicle is drawn forward the drum E is gradually lifted and the wheels D gradually lowered until the latter bear upon the ground and take the weight of vehicle, and the further movement of the disk and segment is arrested by the lever engaging the stops $c^2$, as shown in Fig. 2.

Upon again releasing the lever the vehicle-body drops forward, carrying the crank relatively to the rear and lifting the wheels, while the weight of the implement is carried again upon the roller E, as before.

I also employ a scraper $s$, consisting of a plate of sheet metal cut to the form of a comb, or consisting of separate teeth, attached to the rear cross-bar of the frame and extended forward into scraping contact with the surface of the roller E, as indicated in Figs. 1 and 3 and by dotted lines in Fig. 4.

I claim as my invention and desire to secure by Letters Patent of the United States—

1. An agricultural implement embodying a hollow cylinder or drum adapted to roll in contact with the ground, provided with a series of blades pivoted within the peripheral wall of the drum and projecting through apertures permitting a limited oscillation of the blades, substantially as set forth.

2. An agricultural implement, of the character indicated, embodying a roller with projecting teeth, bearing-wheels journaled upon a cranked axle extending centrally through the drum, and segmental extensions of the cranks adapted to roll upon the ground and lift the roller and frame while bringing the bearing-wheels into position, provided with stops and an engaging lever pivoted to the frame, substantially as set forth.

3. In an implement of the character indicated, the hollow drum provided with blades—the latter being formed of two intersecting blades, one of which extends into the drum as a shank to engage the pivot, and the other projects its shoulders against the outside of the drum, substantially as set forth.

4. In an implement of the character indicated, the combination of the hollow perforated cylindrical drum, the end caps, the fixed bolt-rods extending from end to end through, and securing the caps to the drum, and the blades pivotally hung on the bolt-rods and projecting through the peripheral wall of the drum, substantially as set forth.

In testimony whereof I have hereunto set my hand in the presence of two subscribing witnesses.

JEREMIAH DARLING.

Witnesses:
L. M. HOSEA,
FRANK H. BOWMAN.